(12) United States Patent
Nelson (10) Patent No.: US 9,976,584 B2
(45) Date of Patent: May 22, 2018

(54) MULTI-PIECE PANEL FASTENER

(71) Applicant: Eaton Corporation, Cleveland, OH (US)

(72) Inventor: David Charles Nelson, Princeton, MA (US)

(73) Assignee: Eaton Corporation, Cleveland, OH (US)

(*) Notice: Subject to any disclaimer, the term of this patent is extended or adjusted under 35 U.S.C. 154(b) by 56 days.

(21) Appl. No.: 14/524,154

(22) Filed: Oct. 27, 2014

(65) Prior Publication Data

US 2015/0121664 A1    May 7, 2015

Related U.S. Application Data

(60) Provisional application No. 61/898,632, filed on Nov. 1, 2013.

(51) Int. Cl.
*F16B 5/06* (2006.01)
*F16B 21/07* (2006.01)

(52) U.S. Cl.
CPC ............ *F16B 5/065* (2013.01); *F16B 21/075* (2013.01); *Y10T 24/44026* (2015.01); *Y10T 29/49948* (2015.01)

(58) Field of Classification Search
CPC .. F16B 5/065; F16B 21/075; Y10T 24/44026; Y10T 29/49948
See application file for complete search history.

(56) References Cited

U.S. PATENT DOCUMENTS 3,486,158 A * 12/1969 Soltysik ................ F16B 5/0233
                                                            411/44
4,778,320 A * 10/1988 Nakama .................. F16B 5/065
                                                            24/297

(Continued)

FOREIGN PATENT DOCUMENTS

DE       102004025698 A1 *  12/2005  ............ F16B 1/0071

OTHER PUBLICATIONS

ITW Fastex, Plastic Fasteners Catolog, 2002, Retrieved from the internet on Oct. 23, 2014 at URL http://www.itw-fastex.com/catalog/index.php (2 pages).

(Continued)

*Primary Examiner* — Robert Sandy
*Assistant Examiner* — Louis A Mercado
(74) *Attorney, Agent, or Firm* — Senniger Powers LLP (57) ABSTRACT

A fastener includes a clip including a flexible head having an outer surface configured to engage and edge of a first slot in a first panel when the flexible head is inserted therein and a retainer configured to be inserted into a channel within the flexible head to impede flexing of the flexible head thereby retain the flexible head in the first slot. The clip may further include at least one member extending from the head and configured to engage a second slot in a second panel to hold the first and second panels together when the first and second slots are positioned in an opposing relationship. In some embodiments, the at least one member may include first and second spring arm members extending from the head and having outer surfaces configured to engage edges of the second slot when inserted therein. Methods using such fasteners are also discussed.

7 Claims, 7 Drawing Sheets

(56) References Cited

U.S. PATENT DOCUMENTS

| | | | | |
|---|---|---|---|---|
| 4,784,550 A * | 11/1988 | Wollar | ................ | F16B 19/1081 411/32 |
| 5,647,713 A * | 7/1997 | Ge | ..................... | B29C 45/1676 24/324 |
| 5,775,859 A * | 7/1998 | Anscher | .................. | F16B 5/065 411/344 |
| 6,364,589 B1 * | 4/2002 | Wenglinski | ............. | F16B 5/065 24/297 |
| 6,406,242 B1 * | 6/2002 | Gordon | .................. | E05B 79/06 24/297 |
| 2002/0022532 A1 * | 2/2002 | Tucker, Sr. | ........ | A63B 53/0487 473/288 |
| 2010/0072735 A1 * | 3/2010 | Kirchen | ............. | B60R 13/0206 280/728.2 |
| 2010/0088860 A1 * | 4/2010 | Benedetti | ................ | F16B 5/065 24/297 |
| 2010/0158632 A1 * | 6/2010 | Sano | ................... | F16B 19/1081 411/22 |
| 2012/0240363 A1 * | 9/2012 | Lee | ..................... | B60R 13/0206 24/297 |
| 2013/0136559 A1 * | 5/2013 | Hauser | ................... | F16B 5/065 411/45 |
| 2014/0356063 A1 * | 12/2014 | Tung | ...................... | F16B 2/065 403/374.4 |
| 2015/0298623 A1 * | 10/2015 | Kato | .................. | B60R 13/0206 24/458 |

OTHER PUBLICATIONS

Essentra Components, DCS Metal & Plastic Catch and Striker, Access Hardware, Panel Fasteners, vol. 14, Retrieved from the internet on Oct. 23, 2014 at URL http://www.essentracomonents.com/access-hardware/panel-fasteners/panel-catches-strikers (2 pages).

\* cited by examiner

MULTI-PIECE PANEL FASTENER

RELATED APPLICATION

The present application claims priority from U.S. Provisional Application No. 61/898,632 entitled "MULTI-PIECE PANEL FASTENER," filed Nov. 1, 2013 and incorporated herein by reference in its entirety.

BACKGROUND

The inventive subject matter relates to fasteners and, more particularly, to fasteners for assembling panels, such a sheet metal panel used in electrical equipment.

Electrical equipment enclosures, such as racks used to house data center equipment, commonly are constructed using sheet metal pieces that are fastened together using fasteners that do not require the use of tools. For example, in some products, fasteners referred to as "dryer clips" may be used to attach sheet metal panels to frame pieces that are also fabricated from sheet metal. Such dryer clips consist of a male pin and female socket that are installed in respective sheet metal pieces, allowing the pieces to be attached and separated by insertion and removal of the male pin into and out of the female socket. Problems may arise from the use of such fasteners when, for example, the sheet metal piece carrying the female socket is thicker than intended for the design of the socket, which can result in dislodging of the female socket when the sheet metal pieces are separated. Problems may also occur when the female socket is installed in a hole that allows lateral movement of the socket, which can lead to misalignment with the male pin and breakage of the fastener when attempting to assemble the sheet metal pieces.

SUMMARY

Some embodiments of the inventive subject matter provide a fastener including a clip comprising a flexible head having an outer surface configured to engage and edge of a first slot in a first panel when the flexible head is inserted therein and a retainer configured to be inserted into a channel within the flexible head to impede flexing of the flexible head thereby retain the flexible head in the first slot. The clip may further include at least one member extending from the flexible head and configured to engage a second slot in a second panel to hold the first and second panels together when the first and second slots are positioned in an opposing relationship. In some embodiments, the at least one member may include first and second flexible spring arm members extending from the flexible head and having outer surfaces configured to engage edges of the second slot when inserted therein. The head may be configured to reside on a first side of the first panel and the first and second spring arm members may be configured to reside on a second side of the first panel when the clip is inserted in the first slot.

In some embodiments, the fastener may further include a body portion joining the first and second flexible spring arm members to the flexible head. The body portion may include a first land that confronts the first panel when the head is inserted in the first slot and a second land that confronts the second panel when the first and second spring arm members are inserted in the second slot. The flexible head may include first and second wall members defining the channel therebetween and the body portion may include first and second body portions joining the first and second spring arm members to respective ones of the first and second wall members and having first lands that confront the first panel on first and second sides of the first slot when the head is inserted in the first slot and second lands that confront the second panel on first and second sides of the second slot when the first and second flexible arms are inserted in the second slot.

In some embodiments, the flexible head may include first and second wall members having outer surfaces configured to engage edges of the slot and inner surfaces that define a channel. The first and second wall members may be configured to be compressed toward one another to narrow the head for insertion into the first slot. The first and second wall members may have grooves defined therein configured to receive the edges of the first slot when the head is inserted therein. Insertion of the retainer into the channel may impede flexing of the first and second wall members.

Further embodiments provide a fastener including a clip comprising a flexible head configured to be inserted into a first slot in a first panel, the flexible head comprising first and second wall members configured to engage first and second opposing edges of the first slot when the head is inserted therein and first and second spring arm members extending from respective ones of the first and second wall members and configured to engage first and second opposing edges of a second slot in a second panel when inserted therein. The fastener further includes a retainer inserted into the flexible head between the first and second wall members and that impedes flexing of the head to impede removal of the head from the first slot. The clip may include first and second body portions joining the first and second spring arm members to respective ones of the first and second wall members and having first lands that confront the first panel on first and second sides of the first slot when the head is inserted in the first slot and second lands that confront the second panel on first and second sides of the second slot when the first and second flexible arms are inserted in the second slot.

Further embodiments provide methods of joining first and second panels. A flexible head of a clip is inserted into a first slot in the first panel, the flexible head having an outer surface configured to pass into the first slot and having an outer surface configured to engage an edge of the first slot in the first panel when the flexible head is inserted therein. A retainer is inserted into a channel within the flexible head to impede flexing of the head and thereby retain the flexible head in the first slot. At least one member of the clip extending from the flexible head is inserted into a second slot in a second panel to hold the first and second panels together when the first and second slots are positioned in an opposing relationship. The at least one member may include first and second flexible spring arm members extending from the flexible head and having outer surfaces configured to engage edges of the second slot when inserted therein.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
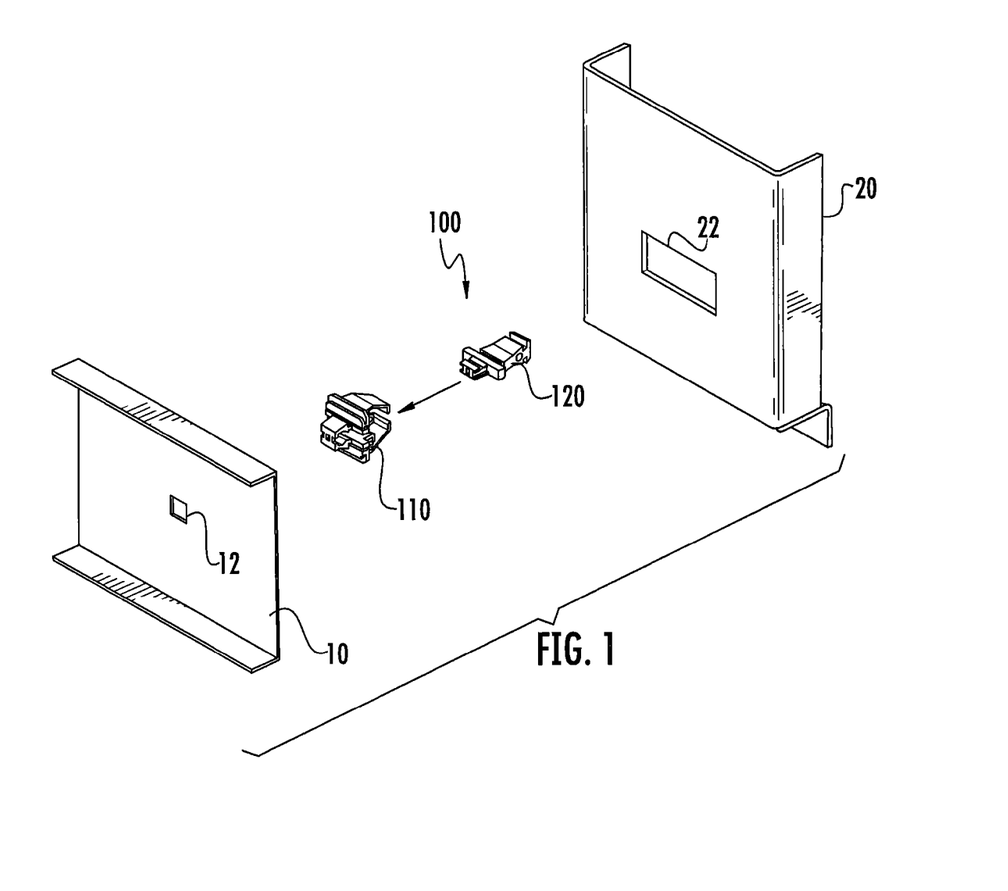
FIG. 1 is an explode view illustrating a fastener for coupling sheet metal pieces according to some embodiments.
Figure 2:
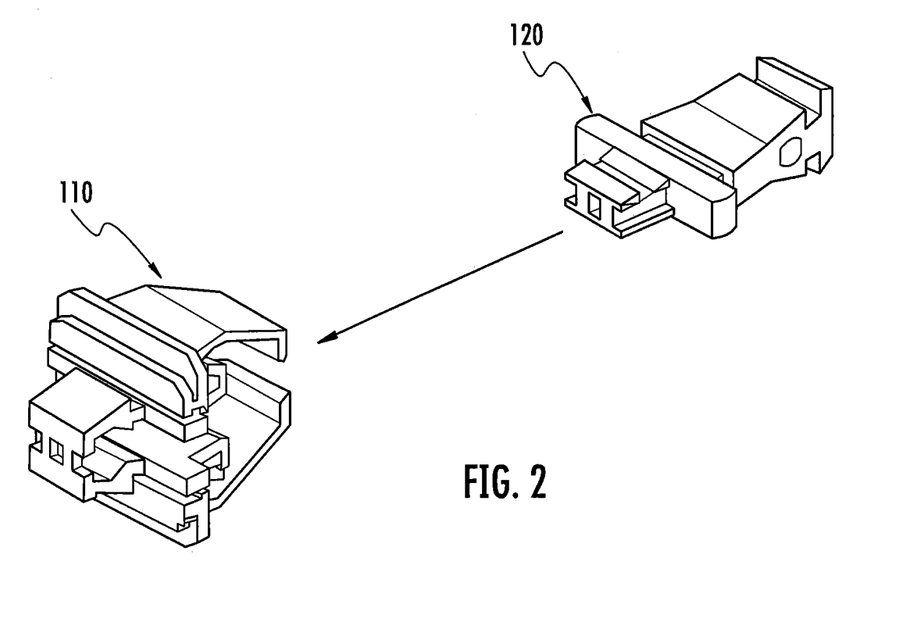
FIG. 2 is a perspective view of clip and retainer of the fastener of FIG. 1.
Figure 3:
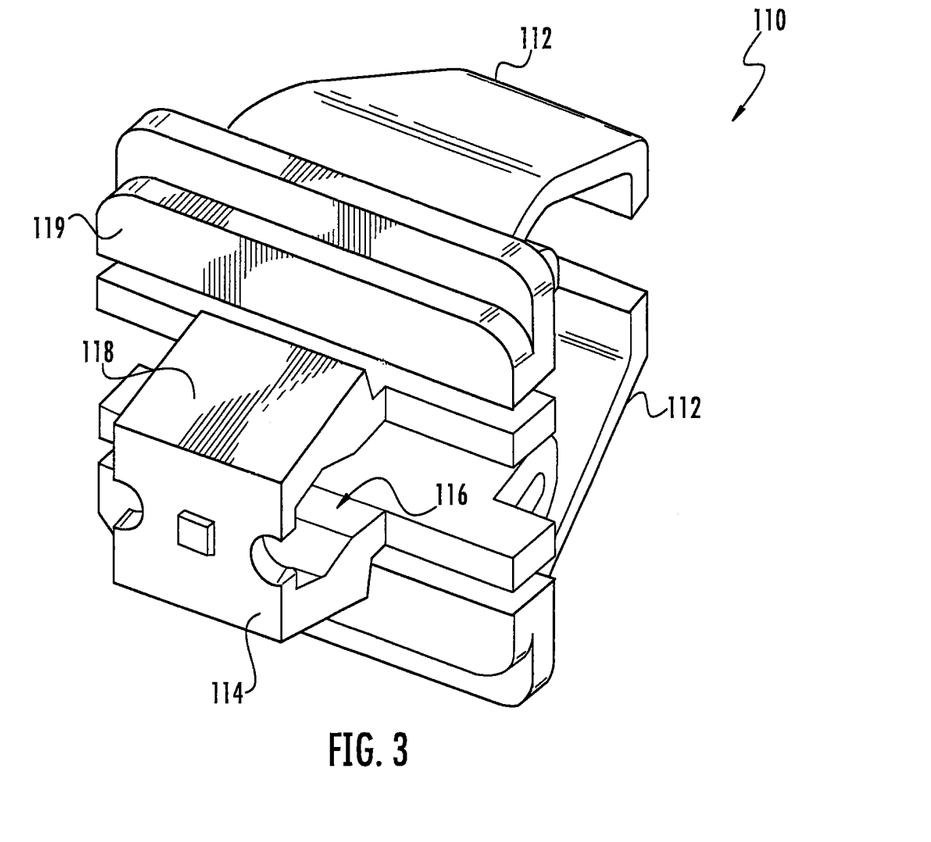
FIG. 3 is a perspective view of the clip of FIG. 2.
Figure 4:
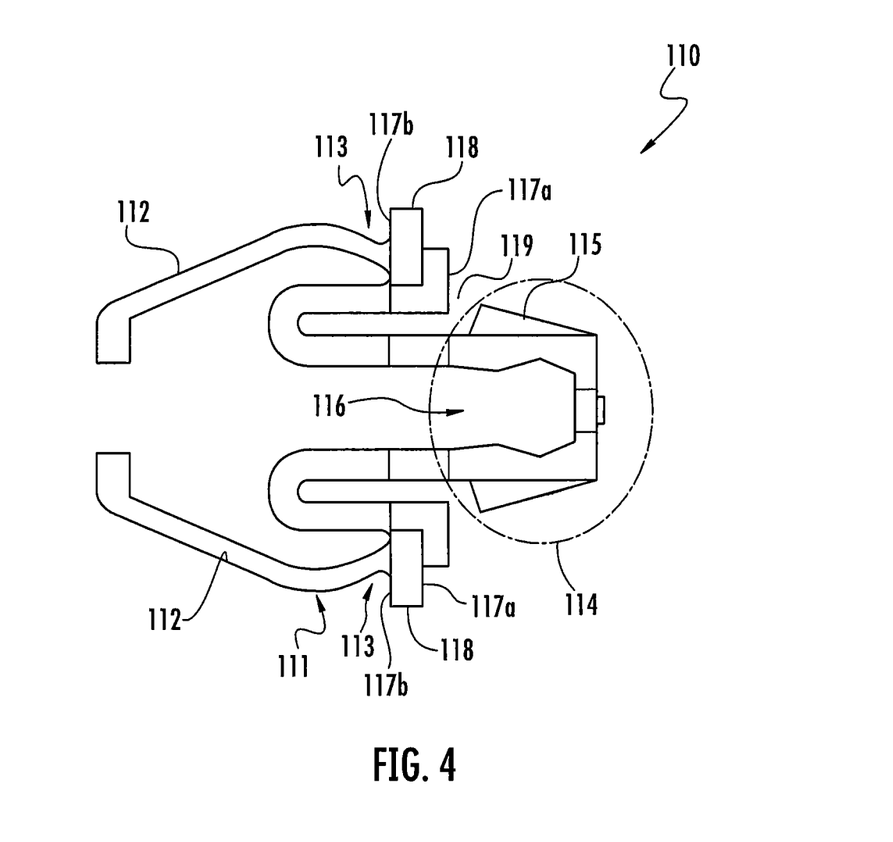
FIG. 4 is side view of the clip of FIG. 2.

FIGS. 1-8 illustrate a fastener 100 according to some embodiments. The fastener 100 includes a clip 110 formed from plastic or other flexible material and having a head 114 configured to be inserted into a rectangular slot 12 in a first panel 10. Referring to FIG. 4, wall members 115 of the head 114 are flexible, and may be deflected by applying pressure thereon to narrow the head 114 to facilitate insertion into the slot 12. As the head 114 is inserted into the slot 12, edges of the slot engage the wall members 115. When the head 114 has been inserted fully into the slot 12, lands 117a of body portions 118 confront the face of the panel 10 and edges of the slot 12 reside in a channels 119 defined by the lands 117a and the wall members 115.

Figure 5:
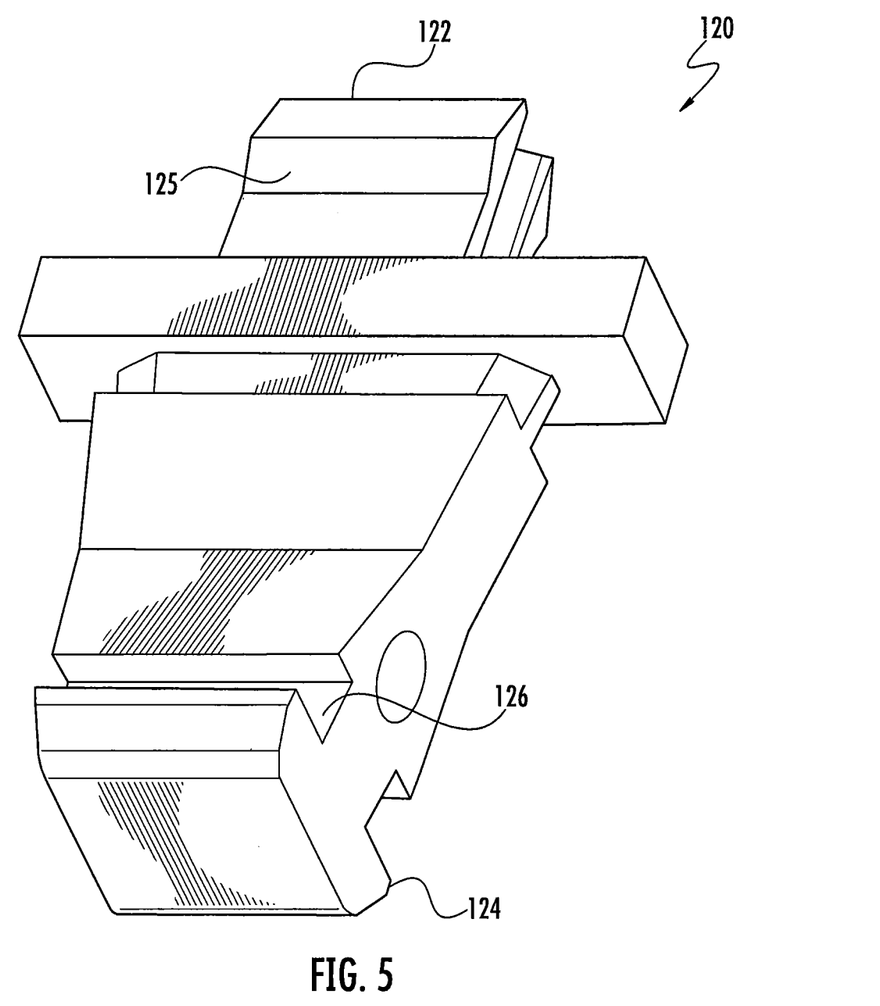
FIG. 5 is a perspective view of the retainer of FIG. 2.
Figure 6:
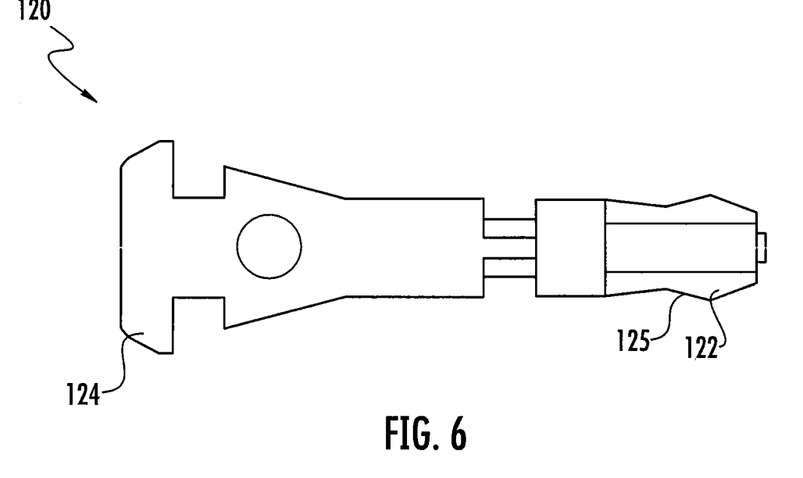
FIG. 6 is a side view of the retainer of FIG. 2.

The clip 110 is secured in the slot 12 by insertion of a retainer 120 into a channel 116 defined by the flexible wall members 115. The retainer 120 may be formed from plastic or other material. Referring to FIG. 5, the retainer 120 includes a locking head 122 configured to displace the wall members 115 of the head 114 as the locking head 122 is inserted into the channel 116. When the retainer 120 is further inserted into the channel 116, the locking head 122 seats in an expanded portion of the channel 116. Engagement of the wall members 115 with shoulder surfaces 125 of the locking head 122 secures the retainer 120 in the clip 110 and the head 114 of the clip 110 in the first panel 10. After full insertion of the retainer 120 into the clip 110, ends of the spring arm members 112 align with grooves 126 proximate an end 124 of the retainer 120. The retainer 120 inhibits flexing of the wall members 115, thus securing the head 114 in the slot 12.

Figure 7:
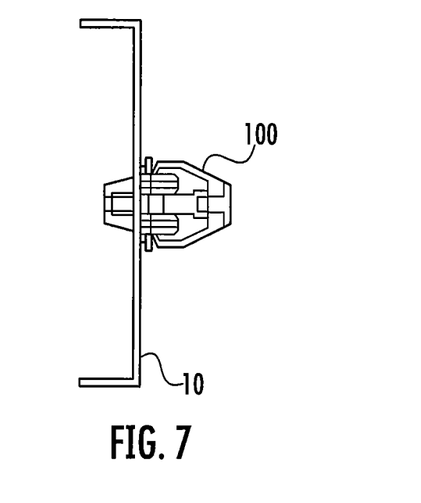
FIG. 7 is a side view of a fastener inserted in a first panel according to some embodiments.
Figure 8:
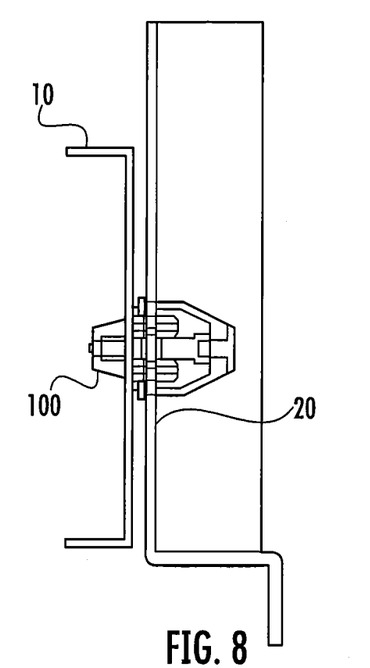
FIG. 8 is a side view of the fastener of FIG. 7 further inserted into a second panel to join the first and second panels.

The assembled fastener 100 attached to the first panel 10 may then be inserted into a second rectangular slot 22 in a second panel 20 to fasten the first panel 10 to the second panel 20. In particular, the spring arm members 112 engage edges of the slot 22, forcing the spring arm members 112 toward one another and engaging the ends of the spring arm members 112 with the grooves 126 in the end 124 of the retainer 120. As the fastener 100 is forced further into the slot 22, the edges of the slot 22 pass beyond portions of the spring arm members 112 that exhibit the greatest spring force and come to rest proximate the bases 113 of the spring arm members 112, thus securing the fastener 100 into the slot 22 which lands 117b of the body portions 118 confronting the face of the second panel 20. Force in a direction opposite the insertion direction may be used to disengage the fastener 100 from the slot 22, with such removal facilitated by pinching together the spring arm members 112 to enable them to clear the edges of the slot 22.

It will be appreciated that a fastener according to some embodiments of the inventive subject matter may be used in a variety of applications. For example, a fastener having the structure of the fastener 100 may be used to fasten sheet metal panels to frame in applications such as electronic equipment cabinets.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A fastener comprising:
a clip comprising first and second flexible wall members attached to one another proximate a first end of the clip and configured to deflect towards one another to enable insertion of the first end of the clip into a first slot in a first panel and to deflect away from one another to engage respective edges of the first slot, the clip further comprising a first spring arm member joined to the first flexible wall member and a second spring arm member joined to the second flexible wall member, the first and second spring arm members configured to deflect toward one another to enable insertion of a second end of the clip into a second slot in a second panel and to deflect away from one another to engage respective edges of the second slot; and
a retainer configured to be inserted between the first and second flexible wall members and between the first and second spring arm members to impede deflection of the first and second wall members towards one another and deflection of the first and second spring arm members towards one another to thereby retain the first and second ends of the clip in respective ones of the first and second slots, wherein the retainer comprises an expanded locking head portion configured to be retained within an expanded portion of a channel defined by the first and second flexible wall members proximate the first end of the clip when the retainer is fully inserted into the clip,
wherein when the retainer is fully inserted into the clip, the first and second spring arm members are configured to be deflectable toward one another, while the first and second flexible wall members are not deflectable, to enable insertion of the second end of the clip into the second slot.

2. The fastener of claim 1, further comprising first and second body portions joining the first and second spring arm members to respective ones of the first and second flexible wall members and wherein each of the first and second body portions comprises a first land that confronts the first panel when the first end of the clip is inserted in the first slot and a second land that confronts the second panel when the first and second spring arm members are inserted in the second slot.

3. The fastener of claim 1, wherein the first and second wall members have grooves defined therein configured to receive the edges of the first slot.

4. The fastener of claim 1, wherein the first spring arm member and first flexible wall member are part of a first continuous piece, wherein the second spring arm member and second flexible wall member are part of a second continuous piece and wherein the first and second continuous pieces are joined at the first end of the clip.

5. A fastener comprising:
a clip comprising:
a flexible head configured to be inserted into a first slot in a first panel, the flexible head comprising first and second flexible wall members configured to engage first and second opposing edges of the first slot when the head is inserted therein; and
first and second spring arm members extending from respective ones of the first and second flexible wall members and configured to engage first and second opposing edges of a second slot in a second panel when inserted therein; and
a retainer inserted into the flexible head between the first and second flexible wall members and that impedes flexing of the head to impede removal of the head from the first slot, wherein the retainer comprises an expanded locking head portion configured to be retained within an expanded portion of a channel defined by the first and second flexible wall members proximate a first end of the clip when the retainer is fully inserted into the clip,
wherein when the retainer is fully inserted into the clip, the first and second spring arm members are configured to be deflectable toward one another, while the first and second flexible wall members are not deflectable, to enable insertion of a second end of the clip into the second slot.

6. The fastener of claim 5, wherein the clip comprises first and second body portions joining the first and second spring arm members to respective ones of the first and second wall members and having first lands that confront the first panel on first and second sides of the first slot when the head is inserted in the first slot and second lands that confront the second panel on first and second sides of the second slot when the first and second spring arm members are inserted in the second slot.

7. The fastener of claim 5, wherein the first spring arm member and first flexible wall member are part of a first continuous piece, wherein the second spring arm member and second flexible wall member are part of a second continuous piece and wherein the first and second continuous pieces are joined at an end of the clip.

\* \* \* \* \*